(12) United States Patent
Asbeck et al.

(10) Patent No.: US 10,059,163 B2
(45) Date of Patent: Aug. 28, 2018

(54) LEAF SPRING AND LEAF SPRING ASSEMBLY

(71) Applicant: Muhr und Bender KG, Attendorn (DE)

(72) Inventors: Jochen Asbeck, Attendorn (DE); Sascha Picur, Wenden (DE); Bernfried Hesselmann, Wenden (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 15/118,162

(22) PCT Filed: Feb. 12, 2015

(86) PCT No.: PCT/EP2015/052955
§ 371 (c)(1),
(2) Date: Aug. 11, 2016

(87) PCT Pub. No.: WO2015/121345
PCT Pub. Date: Aug. 20, 2015

(65) Prior Publication Data
US 2017/0174029 A1  Jun. 22, 2017

(30) Foreign Application Priority Data
Feb. 12, 2014 (DE) .................. 10 2014 202 581

(51) Int. Cl.
*B60G 11/04* (2006.01)
*B60G 11/10* (2006.01)
(Continued)

(52) U.S. Cl.
CPC .............. *B60G 11/04* (2013.01); *B60G 11/02* (2013.01); *B60G 11/10* (2013.01); *F16F 1/3686* (2013.01);
(Continued)

(58) Field of Classification Search
CPC .. B60G 2206/424; B60G 11/02; B60G 11/04; B60G 2204/121; B60G 2206/7101;
(Continued)

(56) References Cited

U.S. PATENT DOCUMENTS 103,041 A  *  5/1870  Goller .................... B60G 11/08
                                                                267/36.1
226,536 A     4/1880  Murch
(Continued)

FOREIGN PATENT DOCUMENTS

| CN | 201679892 U | 12/2010 |
|---|---|---|
| CN | 102767585 A | 11/2012 |

(Continued)

OTHER PUBLICATIONS

International Search Report and Written Opinion for PCT/EP2015/052955 dated Jun. 8, 2015 (12 pages).

*Primary Examiner* — Thomas J Williams
*Assistant Examiner* — James K Hsiao
(74) *Attorney, Agent, or Firm* — Bejin Bieneman PLC

(57) ABSTRACT

A leaf spring for a wheel suspension of a motor vehicle, comprises a first spring part made from a fiber reinforced plastic material and a second spring part made from a steel material. The first spring part and the second spring part are connected to each other. The ratio of the length of the first spring part to the length of the second spring part is larger than two. A leaf spring assembly can include such a leaf spring and receiving devices.

13 Claims, 12 Drawing Sheets

(51) Int. Cl.
  *F16F 3/10* (2006.01)
  *F16F 1/368* (2006.01)
  *B60G 11/02* (2006.01)

(52) U.S. Cl.
  CPC .......... *F16F 3/10* (2013.01); *B60G 2202/112* (2013.01); *B60G 2202/117* (2013.01); *B60G 2204/121* (2013.01); *B60G 2206/428* (2013.01); *B60G 2206/7101* (2013.01); *B60G 2206/72* (2013.01); *B60G 2206/722* (2013.01); *B60G 2206/82* (2013.01); *F16F 2228/066* (2013.01)

(58) Field of Classification Search
  CPC ......... B60G 2202/117; F16F 3/10; F16F 3/12; F16F 2228/066; F16F 2202/117
  USPC .................................................... 267/45, 46
  See application file for complete search history.

(56) References Cited

U.S. PATENT DOCUMENTS

| | | | | |
|---|---|---|---|---|
| 1,182,181 A | 5/1916 | Laycock | | |
| 1,324,440 A | 12/1919 | Ackerman | | |
| 1,354,980 A * | 10/1920 | McDowell | ............ | B60G 11/02 267/46 |
| 1,558,017 A * | 10/1925 | Kintz | ................... | B60G 11/02 267/45 |
| 1,564,299 A * | 12/1925 | Welsh | ................... | B60G 11/04 267/265 |
| 1,616,559 A * | 2/1927 | Tussing | ................ | B60G 11/34 267/260 |
| 1,632,993 A * | 6/1927 | Brush | .................. | B60G 11/107 267/271 |
| 1,783,394 A * | 12/1930 | Stranahan | ............. | B60G 11/10 267/30 |
| 3,142,598 A * | 7/1964 | Rosen | .................. | B29C 70/347 156/162 |
| 3,376,033 A * | 4/1968 | Sherwood | ............. | B60G 11/04 267/47 |
| 3,456,939 A * | 7/1969 | Duchemin | ............... | F16F 1/20 267/47 |
| 3,586,307 A * | 6/1971 | Brownyer | .............. | B60G 11/10 267/47 |
| 3,873,077 A * | 3/1975 | Jorn | ......................... | F16F 1/26 267/152 |
| 4,411,159 A * | 10/1983 | Spear | ..................... | F16F 1/368 177/211 |
| 4,630,804 A * | 12/1986 | Fesko | .................. | B60G 11/113 264/149 |
| 4,643,406 A * | 2/1987 | Mounier-Poulat | .... | B60G 11/113 267/148 |
| 4,771,997 A * | 9/1988 | Haldenwanger | ...... | F16F 1/3686 267/149 |
| 4,772,044 A * | 9/1988 | Booher | ................... | B29C 70/52 267/149 |
| 4,781,364 A * | 11/1988 | Finn | ..................... | B60G 11/181 267/260 |
| 4,886,254 A * | 12/1989 | Carpentier | ............. | B29C 70/86 267/148 |
| 4,887,802 A * | 12/1989 | Wilcox | ................. | B60G 11/12 267/148 |
| 4,894,108 A * | 1/1990 | Richard | .................. | B29C 70/24 156/245 |
| 4,969,633 A * | 11/1990 | Ryan | ..................... | B29C 33/005 267/149 |
| 5,129,672 A * | 7/1992 | Hiromoto | ............. | B60B 35/006 267/148 |
| 5,161,785 A * | 11/1992 | Ingvarsson | ............ | B60G 11/04 267/45 |
| 5,248,130 A * | 9/1993 | Lisowsky | .......... | B23K 15/0033 148/565 |
| 5,444,195 A * | 8/1995 | Dojo | ....................... | E04F 15/20 181/208 |
| 5,647,296 A * | 7/1997 | Pasanen | .................... | B63B 1/22 114/219 |
| 5,938,221 A * | 8/1999 | Wilson | ................... | B60G 11/10 267/260 |
| 6,012,709 A * | 1/2000 | Meatto | ................... | B60G 11/04 267/36.1 |
| 6,056,276 A * | 5/2000 | Muzio | ..................... | F16F 1/20 267/148 |
| 6,176,478 B1 * | 1/2001 | Heitzmann | ............ | B60G 11/12 267/269 |
| 6,406,007 B1 * | 6/2002 | Wilson | ................... | B60G 11/02 267/283 |
| 6,530,562 B1 * | 3/2003 | Sutton | ................... | B60G 11/04 267/36.1 |
| 7,032,624 B2 * | 4/2006 | Bruske | ...................... | D03C 1/16 139/30 |
| 7,210,673 B2 * | 5/2007 | Platner | ................ | B60G 11/465 267/36.1 |
| 8,172,245 B2 * | 5/2012 | Gerrard | .................. | B60G 9/003 280/124.175 |
| 8,950,766 B2 * | 2/2015 | Schonen | ............... | B60G 11/02 280/124.17 |
| 9,597,938 B2 * | 3/2017 | Spiegel | .................. | B60G 11/02 |
| 2005/0051933 A1 * | 3/2005 | Platner | .................... | B60G 7/04 267/38 |
| 2005/0236794 A1 * | 10/2005 | Cai | ........................ | B21D 53/84 280/124.107 |
| 2006/0103103 A1 * | 5/2006 | Land | ....................... | B60G 7/02 280/124.163 |
| 2006/0143849 A1 * | 7/2006 | Weiler | .................. | B60S 1/0411 15/250.201 |
| 2008/0252033 A1 * | 10/2008 | Platner | ................... | B60G 11/10 280/124.163 |
| 2012/0271434 A1 * | 10/2012 | Friesen | ..................... | A61F 2/66 623/55 |
| 2013/0056900 A1 * | 3/2013 | Muller | ................... | B29C 70/48 264/160 |
| 2014/0042680 A1 * | 2/2014 | Glover | ................... | F16F 1/368 267/158 |
| 2014/0167339 A1 * | 6/2014 | Wagner | ................. | B60G 11/08 267/260 |
| 2014/0284856 A1 * | 9/2014 | Stay | ....................... | B60G 11/02 267/47 |
| 2014/0353937 A1 * | 12/2014 | Girelli Consolaro | ....... | B60G 21/0551 280/124.128 |
| 2015/0091225 A1 * | 4/2015 | Wilson | ..................... | C21D 1/25 267/47 |
| 2016/0159181 A1 * | 6/2016 | Hahn | .................... | F16F 1/3686 267/40 |
| 2016/0207369 A1 * | 7/2016 | Krahn | ....................... | F16F 1/26 |

FOREIGN PATENT DOCUMENTS

| | | |
|---|---|---|
| DE | 898154 C | 11/1953 |
| DE | 10323693 B3 | 9/2004 |
| DE | 2009015662 B3 | 10/2010 |
| DE | 102009032919 A1 | 2/2011 |
| DE | 102010015951 A1 | 9/2011 |
| JP | US55-037742 | 3/1980 |
| JP | S55-70634 U | 5/1980 |
| JP | S6175005 A | 4/1986 |
| JP | H0367746 A | 3/1991 |
| JP | 2003335119 A1 | 11/2003 |
| JP | 2005-075203 A | 3/2005 |
| JP | 2005096493 A | 4/2005 |
| JP | 2006044345 A | 2/2006 |
| WO | 9729920 A1 | 8/1997 |
| WO | 0169103 A1 | 9/2001 |
| WO | 2009027710 A1 | 3/2009 |

* cited by examiner

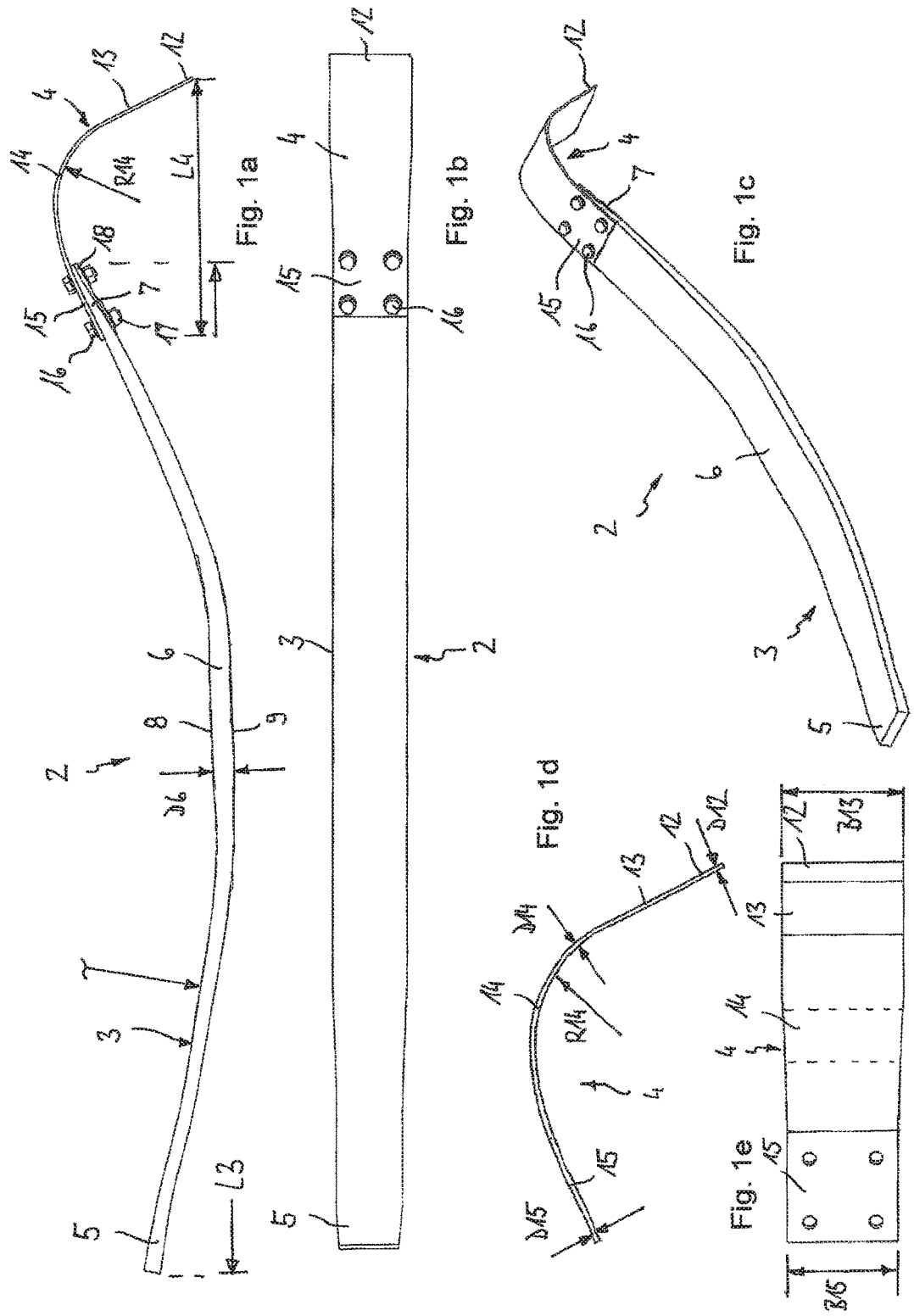

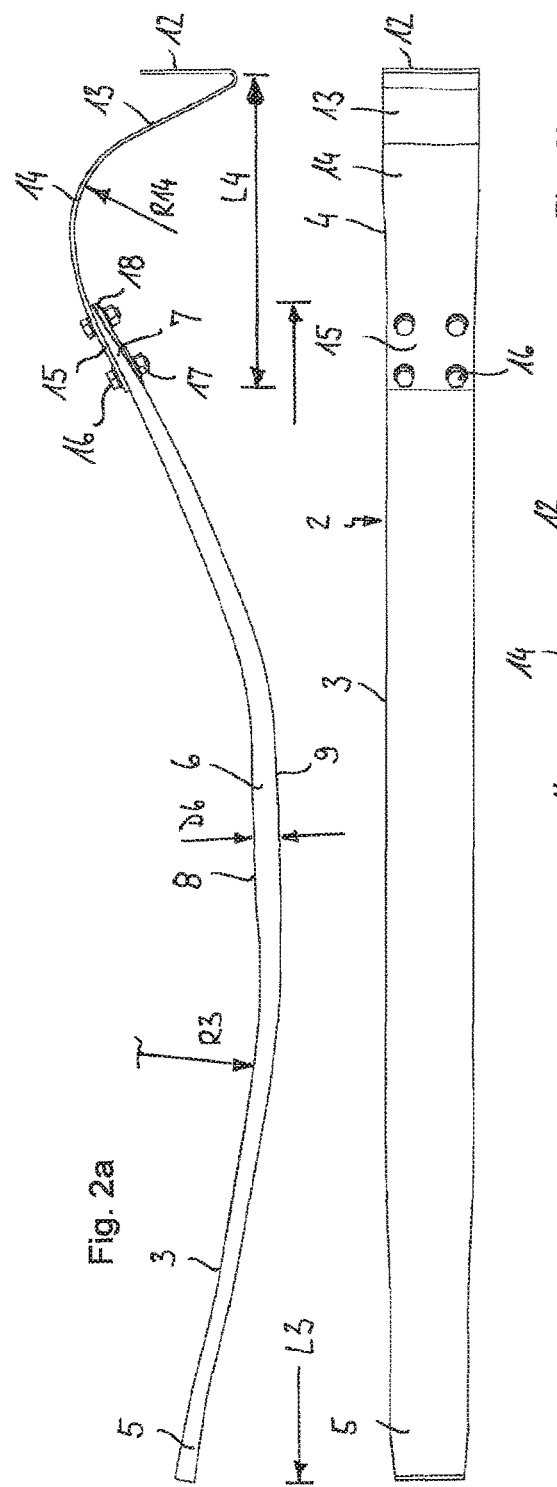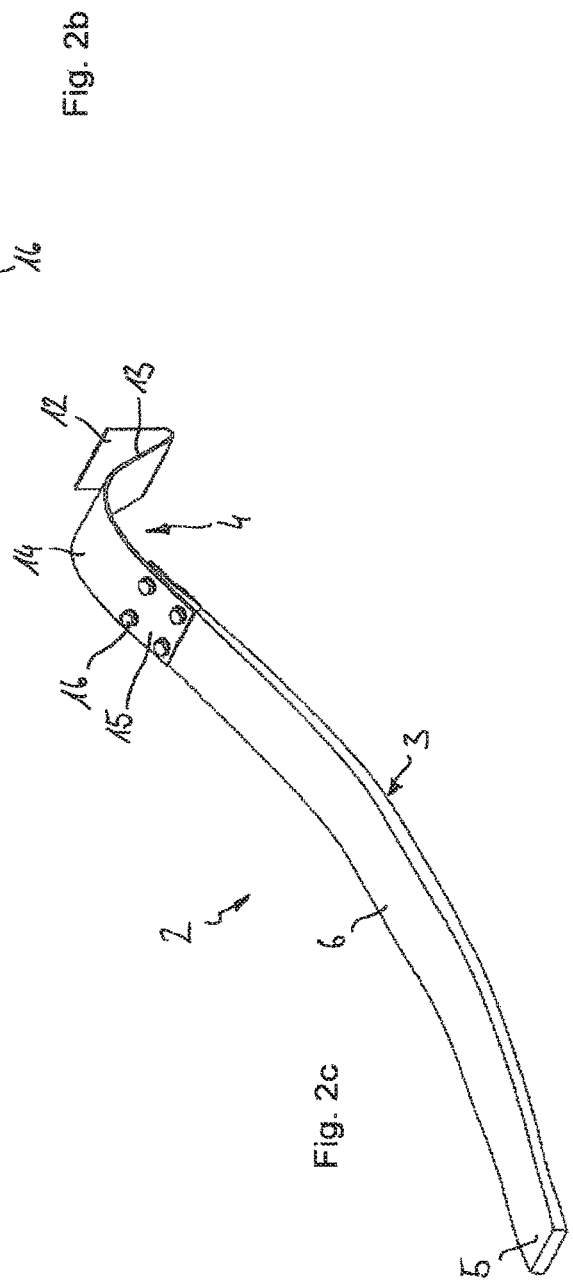

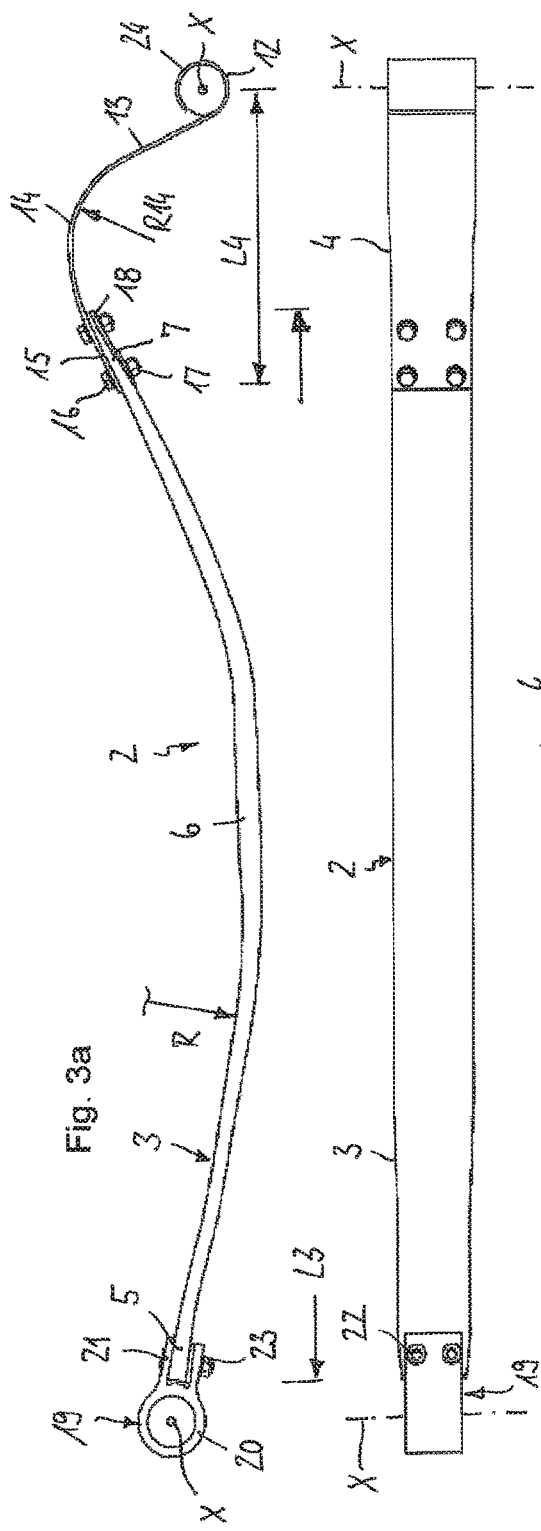
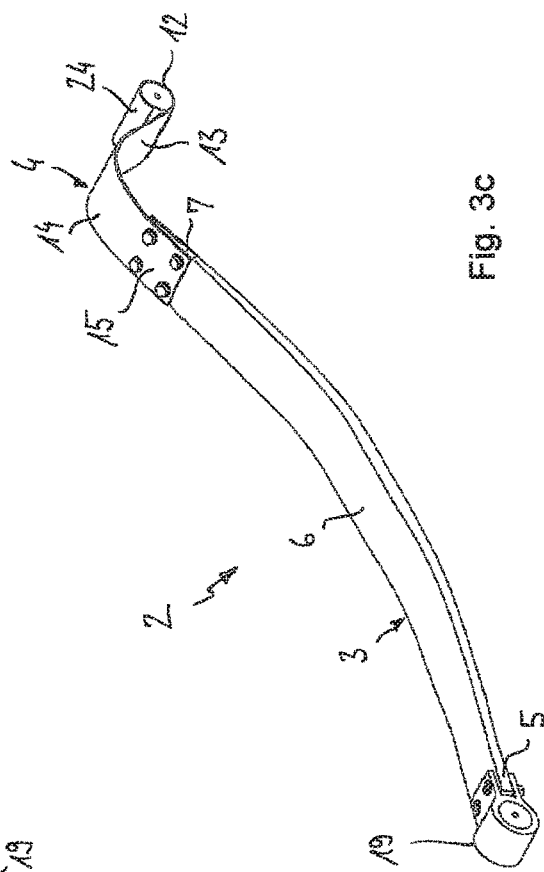
Fig. 3a
Fig. 3b
Fig. 3c

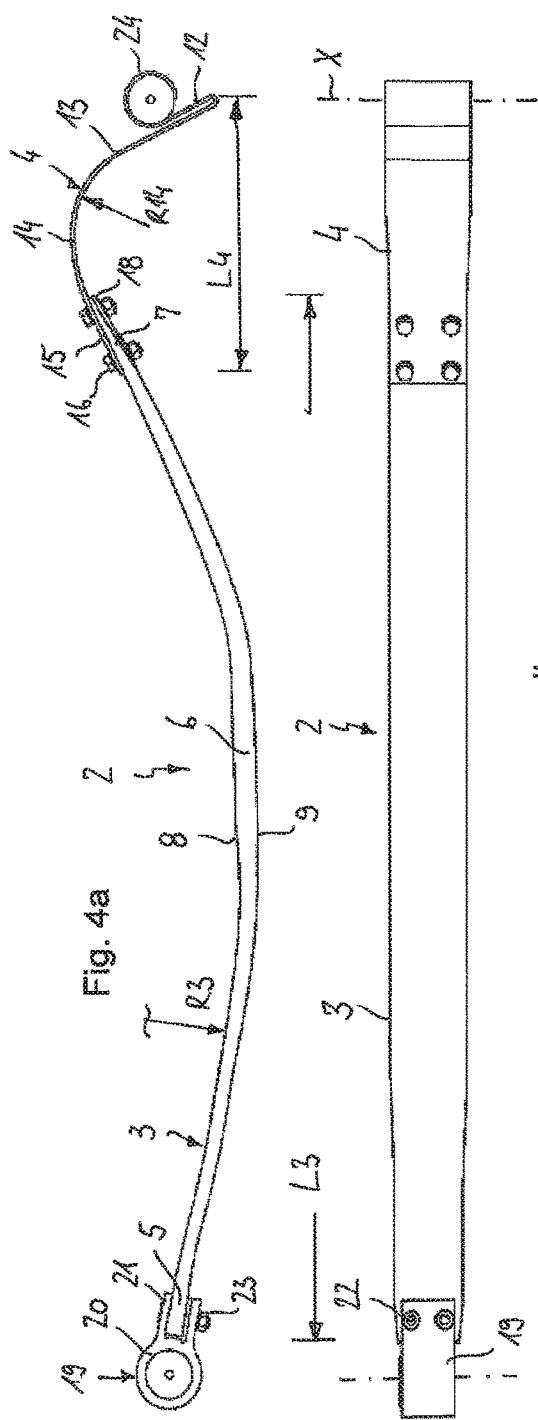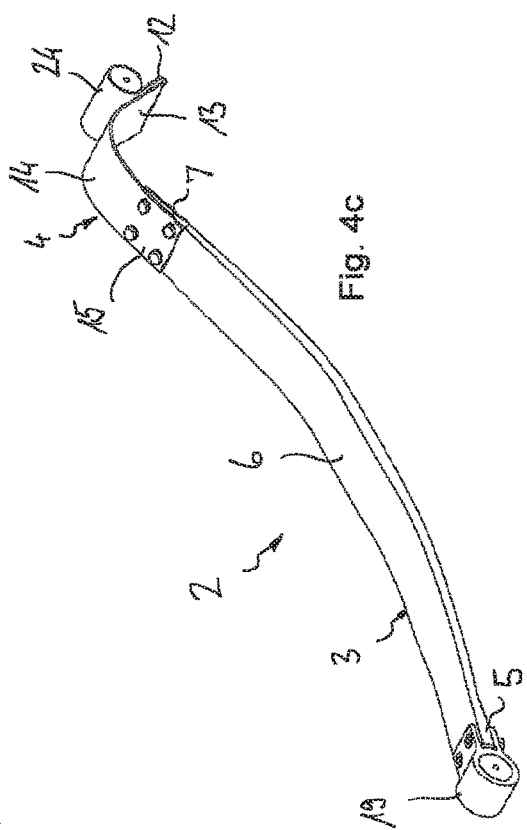

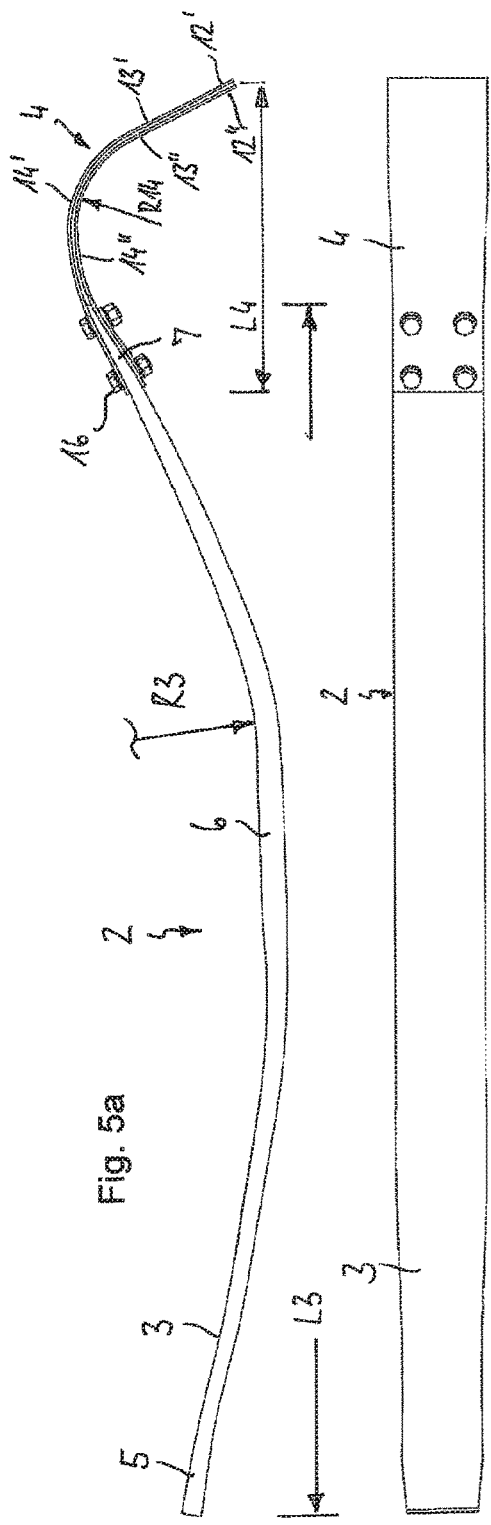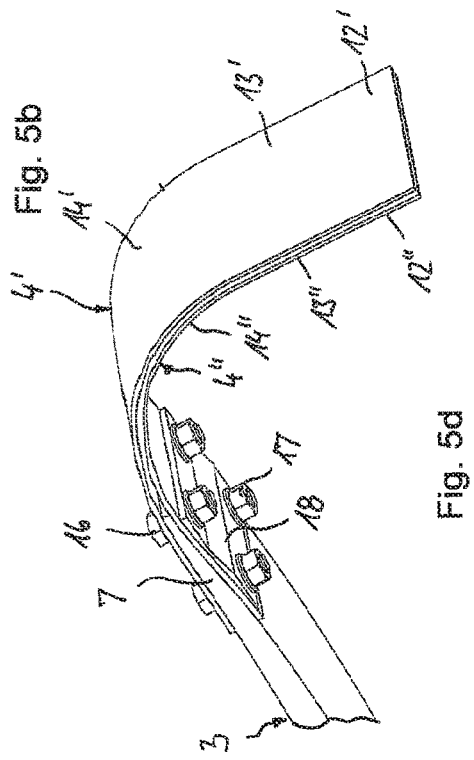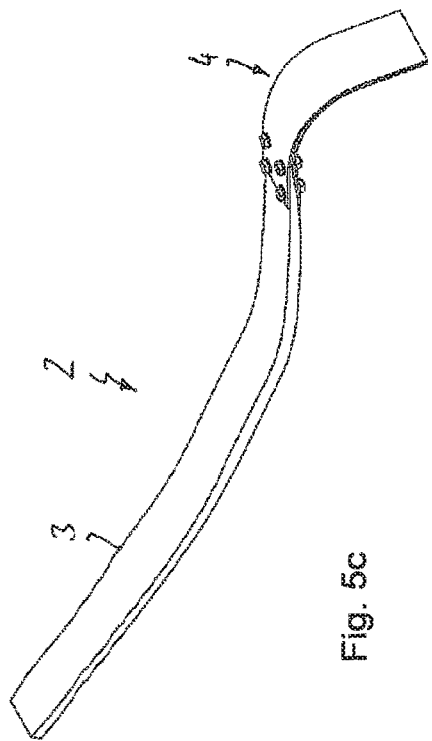

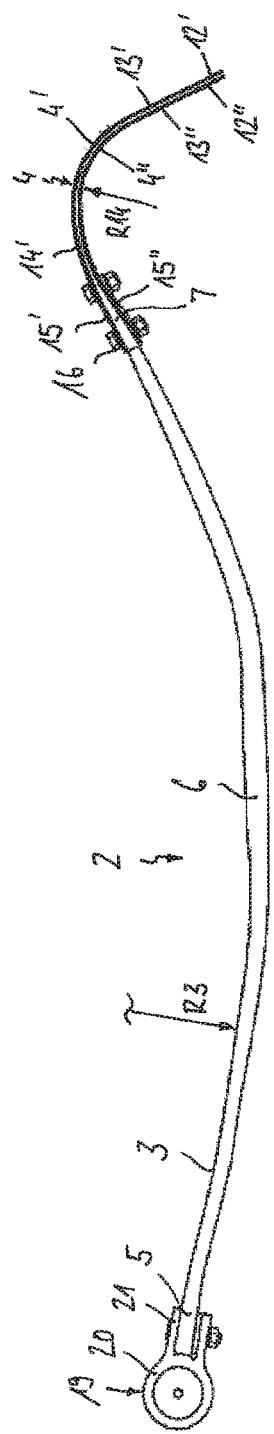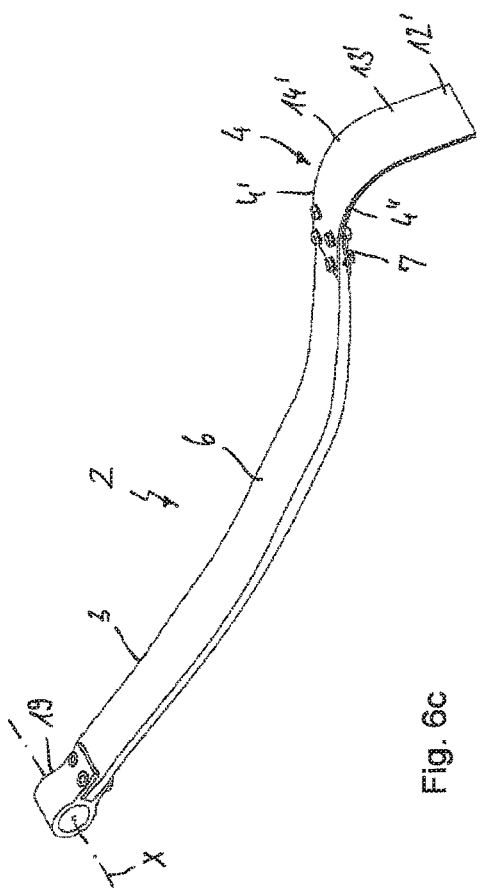

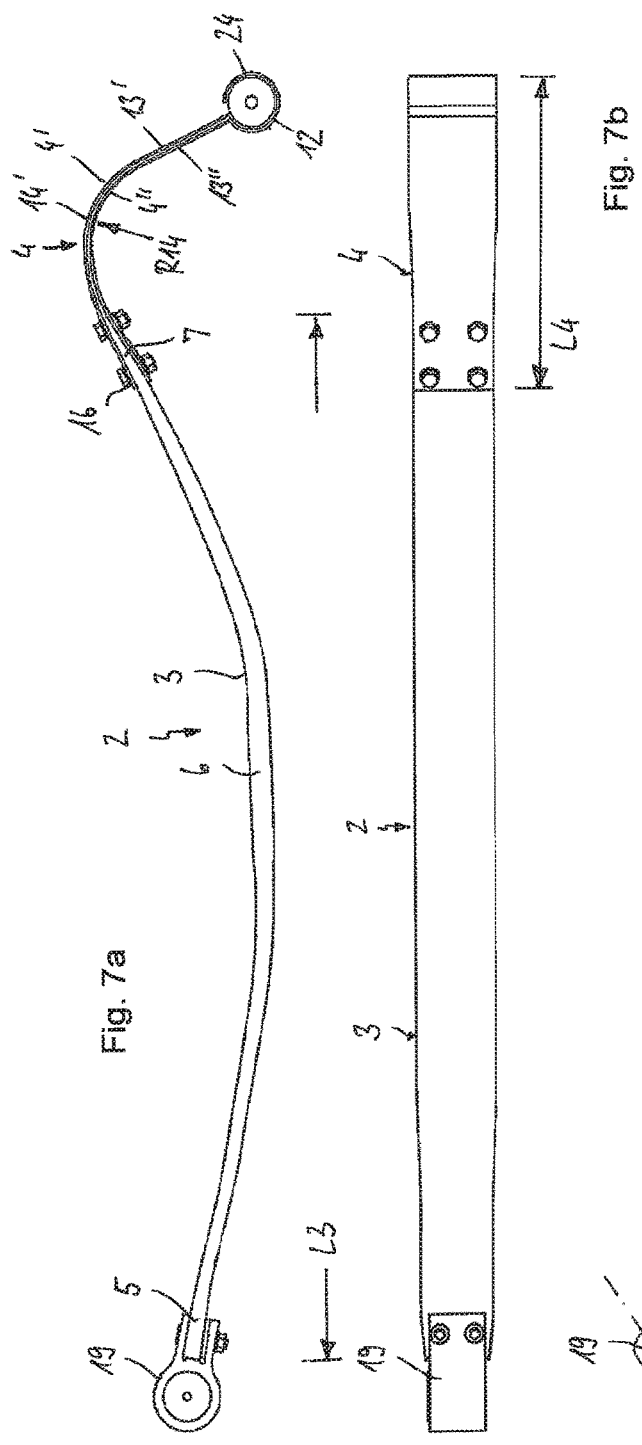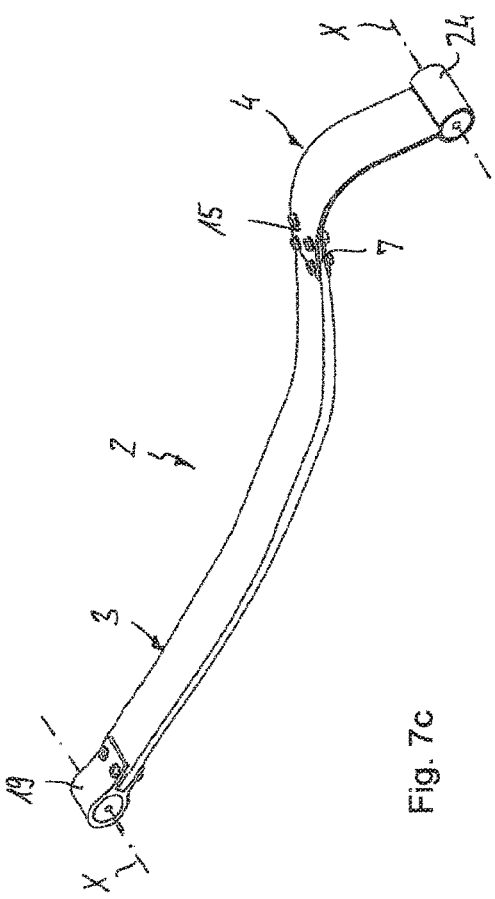

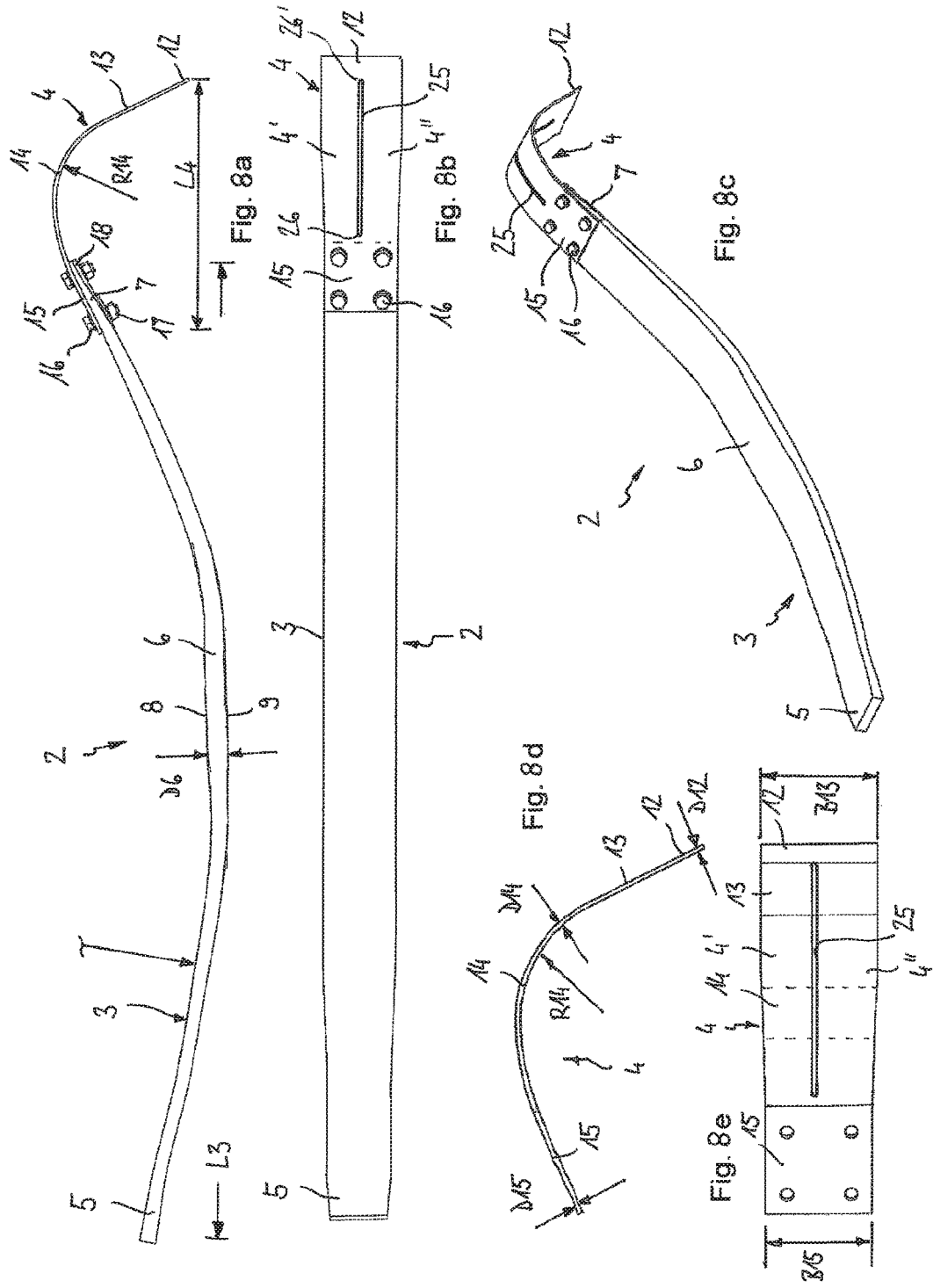

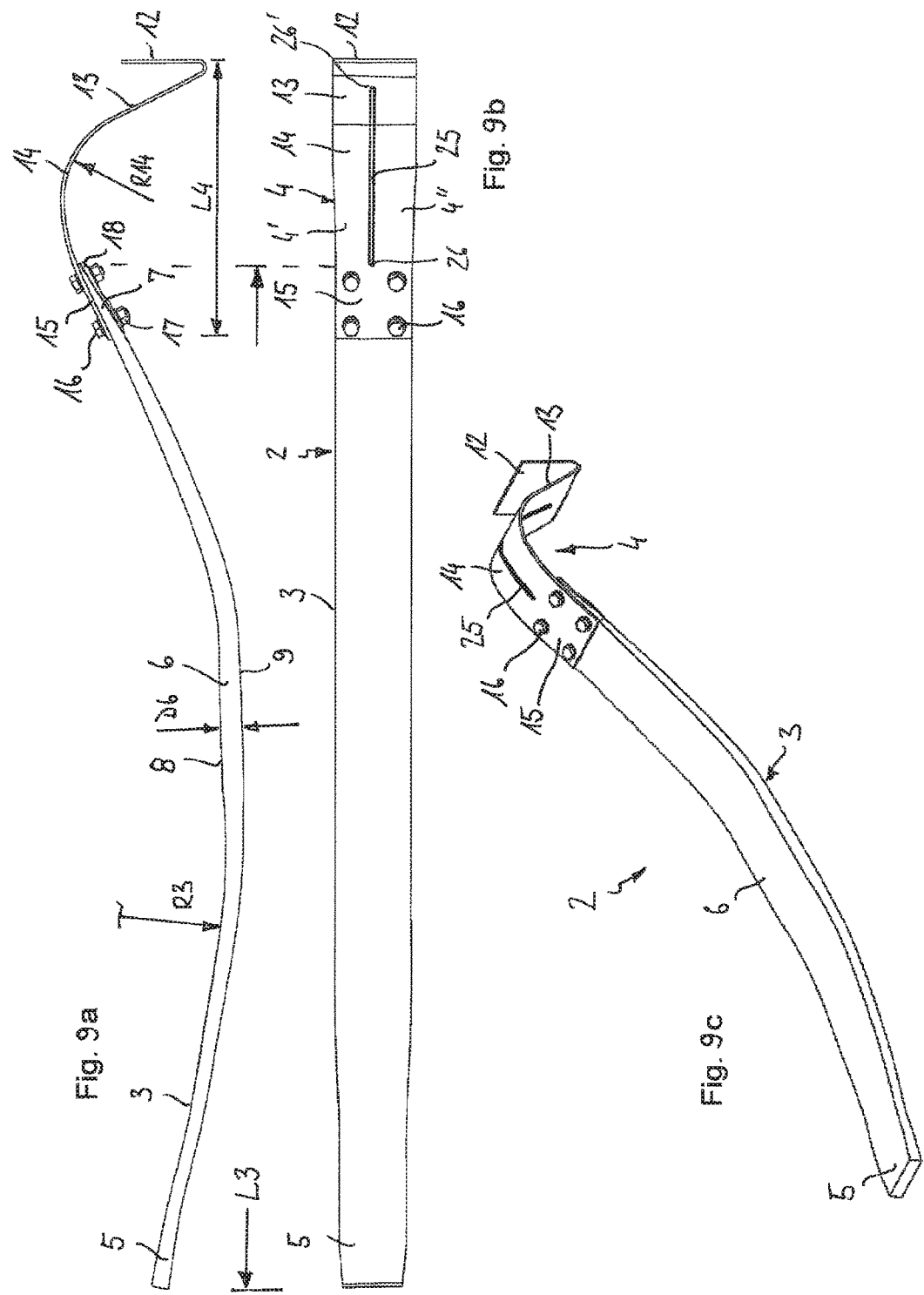

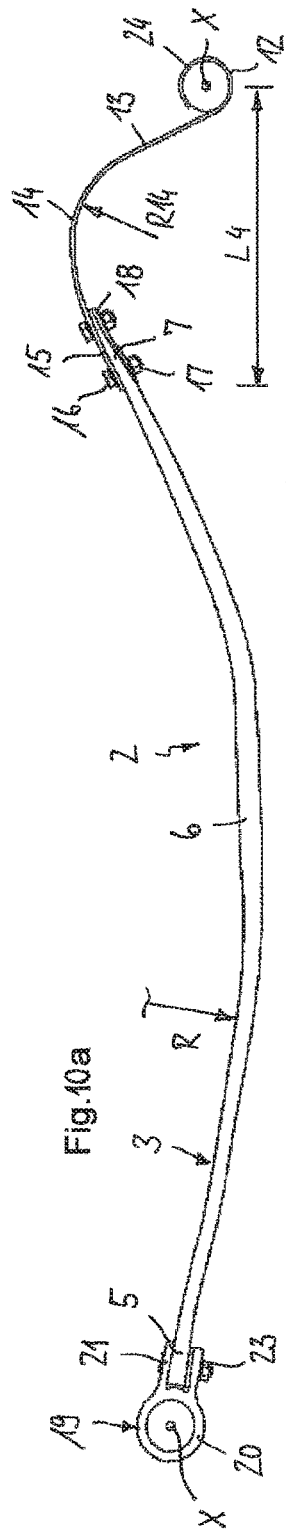
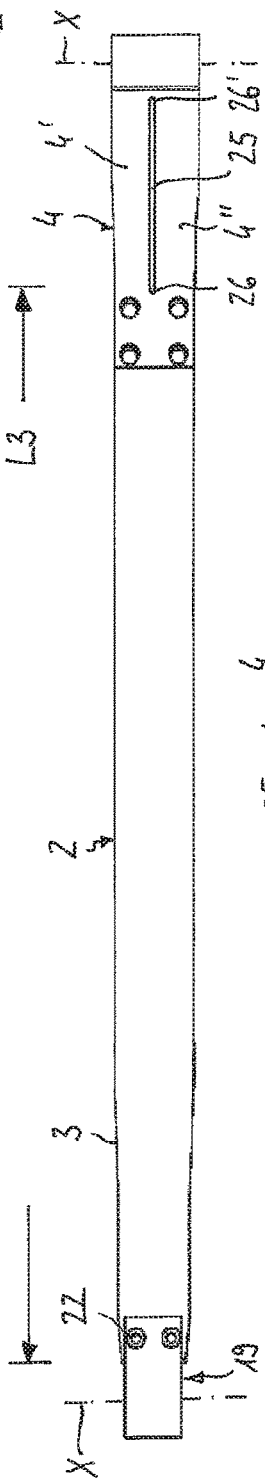
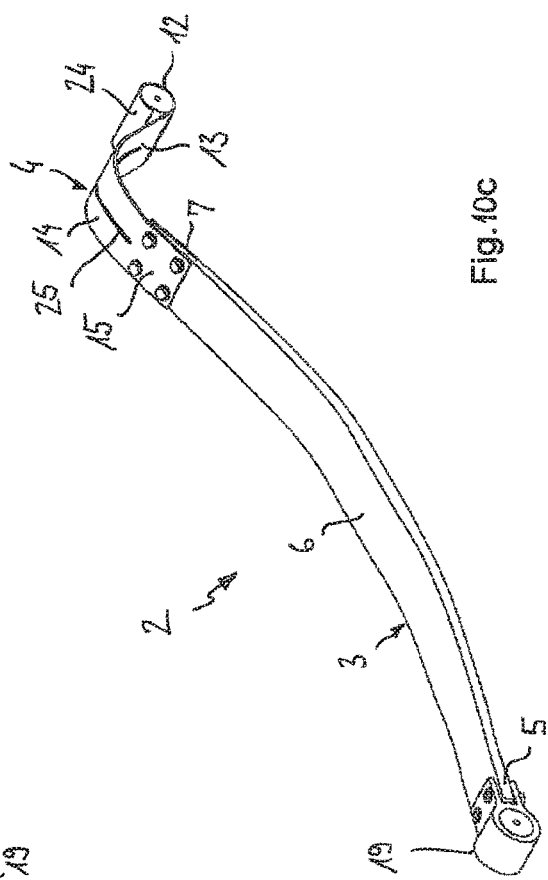
Fig. 10a
Fig. 10b
Fig. 10c

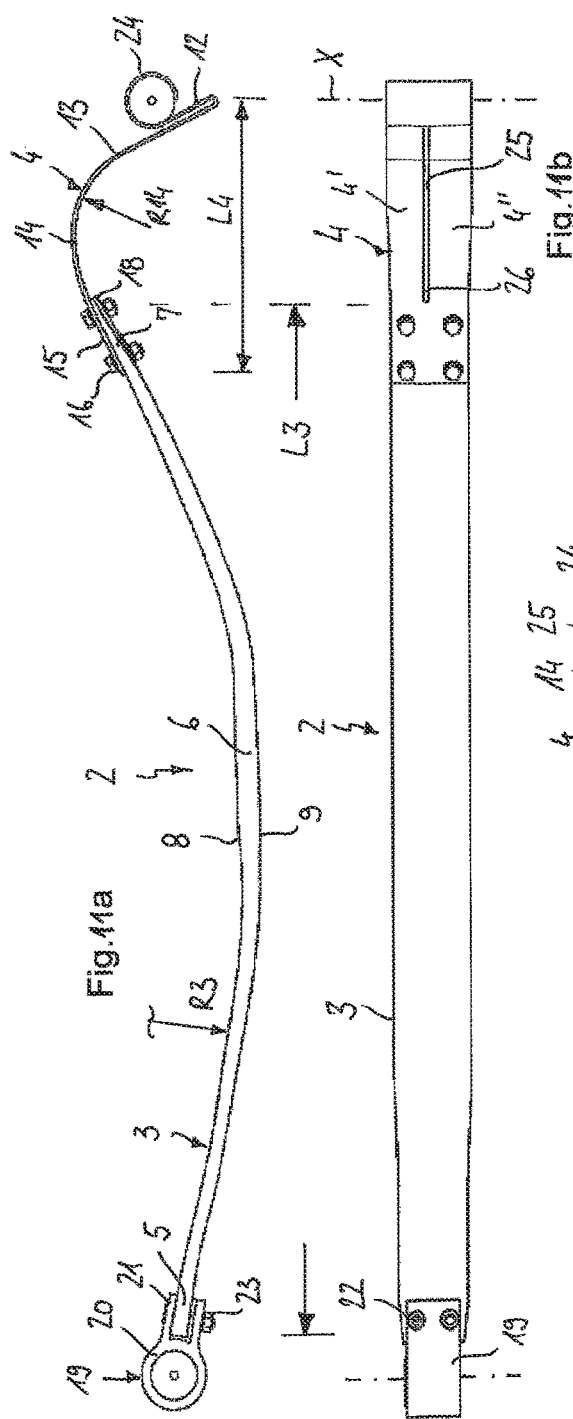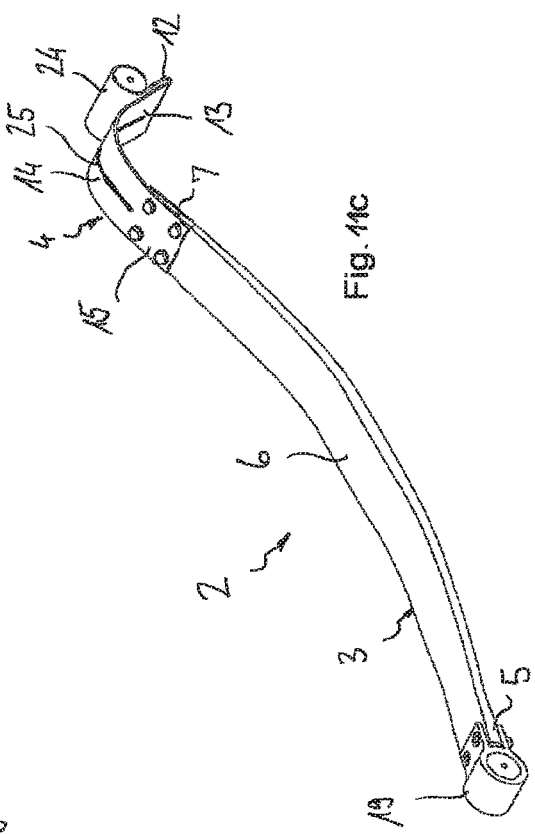

LEAF SPRING AND LEAF SPRING ASSEMBLY

CROSS-REFERENCE TO RELATED APPLICATIONS

This application is a national stage of, and claims priority to, Patent Cooperation Treaty Application No. PCT/EP2015/052955, filed on Feb. 12, 2015, which claims priority to German Application No. DE 10 2014 202 581.8 filed on Feb. 12, 2014, each of which applications are hereby incorporated herein by reference in their entireties.

BACKGROUND

From document JP 2005096493 A, a wheel suspension device with a leaf spring is known. The suspension device comprises a front spring leaf and a rear spring leaf which are connected to each other by bolts. The ends of the front spring leaf and the rear spring leaf are pivotally supported to a side rail. A wheel axis is connected to the front spring leaf. The rear spring leaf has a U-shaped curved part that allows a load-induced deformation of the leaf spring. For the front spring leaf a spring steel or fiber reinforced plastic can be used and, for the rear spring leaf carbon steel or alloyed steel can be used.

From JP 2003335119 A, a leaf spring for a suspension device is known, comprising a thick front spring leaf and a thin rear spring leaf which are connected to each other. The front spring leaf is with its front end pivotally supported at a chassis frame and with its rear end connected to a wheel axle. The rear spring leaf comprises a bent middle part and a rear end that is pivotally supported at the chassis frame. The thinner rear spring leaf is separately produced and heat-treated.

From DE 103 23 693 B3, a sheet metal element made of flexible rolled strip material is known.

From DE 10 2010 015 951 A1, a leaf spring for motor vehicles is known, which is made from fibre reinforced plastic material. The leaf spring is supposed to absorb side load forces and to transfer them to a leaf spring accommodation device. The leaf spring comprises a bending joint portion and a spring portion.

From US 2008/0252033 A1, a leaf spring for a wheel suspension of a motor vehicle is known. The leaf spring is made from a fibre reinforced plastic material and on its ends connected to elastic members, which are mounted on the chassis of the motor vehicle. In an embodiment the ends are bent upwards and are respectively pivotably supported around the longitudinal axis of the motor vehicle in an elastic bushing.

From DE 10 2009 032 919 A1, a spring arrangement with a leaf spring made from fibre compound material is known. The leaf spring has a central portion and two end portions following thereto, which respectively are accommodated in a bearing bracket.

From DE 898 154 A1, a spring suspension system of track vehicles with a leaf spring is known. An end of the leaf spring is formed as an eye by means of which it is supported on the undercarriage. With increasing flexure, the spring ends of the leaf spring are supported on elastic abutments.

From DE 2009 015 662 B3, a spring arrangement with a leaf spring for a motor vehicle is known. The leaf spring is made from a fibre compound material and is held at an end in a clamping member. The clamping member is pivotably mounted on the bearing bracket of the motor vehicle. An abutment is provided on the bearing bracket, against which the clamping member can be supported.

Leaf tensioning springs need to have a very high deformability in the area of the curved portion. This deformability is necessary in order to introduce a tensioning load into the curved portion, besides a bending load, upon increasing deflection. The stiffness of the leaf spring is disproportionately high due to said tensioning load, so that with increasing deflection a strong progression occurs in the spring rate. Because of this high deformability requirements in the curved portion, a glass fibre reinforced plastic material (GRP) is especially suitable as material, which besides a high elasticity and high bearable stresses also has an especially low weight.

It is difficult to satisfy the opposite requirements of a leaf tensioning spring, namely high elasticity in specific areas and high stiffness in other areas.

SUMMARY

Disclosed herein is a leaf spring especially for a wheel suspension of a motor vehicle with a first spring part made of fibre reinforced plastic material and a second spring part made of steel material. Further disclosed is a leaf spring arrangement with such a leaf spring, a first receiving device for supporting a first spring end and a second receiving device for supporting the second spring end. The disclosed leaf spring for motor vehicles, which besides providing a progressive spring characteristic with sufficient stiffness, can reliably fulfil the requirements of robustness in the respective technical application, and at the same time to have a low weight. Further, the leaf spring arrangement with such a leaf spring has a low weight and has a long service life.

The leaf spring for a wheel suspension of a motor vehicle comprises: a first spring part made from a fibre reinforced plastic material and a second spring part made from a steel material, wherein the first spring part and the second spring part are connected to each other, wherein in particular it is provided that the ratio of the length of the first spring part to the length of the second spring part is greater than two.

An advantage of the leaf spring is that it has an especially high stiffness in the second spring part. At the same time the leaf spring has a low weight due to the length and the fibre compound material of the first spring part. Overall, said leaf spring thus combines the requirements of a highly stressable and light spring with a progressive spring characteristic, which can also be referred to as a spring rate. Because the first spring part is more than twice as long as the second spring part, a functional separation of the two spring parts is effected. The long first spring part assumes substantially the actual spring function of the leaf tension spring, while the short second spring part assumes substantially a flexural joint function for compensating a deflection of the first spring part. Said lengths of the spring parts refer in particular to the length of the respective spring part in a top view of the unloaded spring. It is to be understood, however, that also another consideration of the length is possible such as the length of the developed view of the respective spring part.

A progressive spring characteristic is especially achieved such that the ends of the leaf spring are supported non-displaceably in respective supports. Because of the non-displaceable accommodation of the spring ends, the tensioning forces increase progressively with increasing loading of the leaf spring, so that also its spring characteristic increases progressively. In the assembled condition this has the result that the suspension becomes stiffer with increasing loading of the motor vehicle, which has a positive effect on drive comfort and drive stability.

The leaf tension spring is especially suitable for use in light utility vehicles and pick-ups. For this application area, an especially robust product design is necessary. The robustness of chassis components relates to all environmental influences, however, and also to mechanical influences like stone-chipping. The sensitivity of glass fibre reinforced plastic material is rather high because of the comparably low hardness and wear resistance in view of these influences. The second spring part made from steel material achieves a higher stiffness in this portion of higher loadings. Overall, the leaf spring has thus an especially long service life with light-weight design.

The first and the second spring part of the leaf spring, which can also be referred to as a spring assembly, differ in view of their length and/or curvature from each other. In the assembled condition of the leaf spring, a wheel carrier is attached to the first spring part, via which wheel carrier the forces of the wheel of the motor vehicle are introduced into the leaf spring. In the assembled condition the first spring part extends preferably substantially in a longitudinal direction of the motor vehicle. In this case, an imaginary first line extending through the ends of the first spring part is arranged substantially horizontally or encloses a small first angle with the horizontal. The second spring part is, starting from the first part, bent downwards. In this case, an imaginary second line extending through the two ends of the second spring part is arranged at an angle to the first line and encloses a larger second angle with the horizontal. The vertical forces introduced by the wheel carrier into the first spring part initially lead to a bending load in the second spring part and then with increasing bending of the second spring part to an increasing tensioning load. In this manner, the spring rate of the whole spring arrangement increases progressively with increasing loading.

It is also possible that the leaf tensioning spring has one or more further spring parts besides the first spring part and the second spring part. In particular, it can be provided, that at both ends of the first spring part made of plastic, a respective second spring part, made from steel, is connected thereto.

By constructively designing the first spring part and/or the second spring part in respect of physical parameters such as cross-sectional area, length or width, the suspension behaviour and, respectively, the progression of the leaf spring can be set. In this connection it applies that, the longer the second spring part or the smaller the cross-sectional area of the second spring part is, the softer the spring. Vice versa, the shorter or thicker the second spring part is, the stiffer is the spring. Preferably, the first spring part has, in the relaxed condition, a lower convex curvature. The second spring part has, in the relaxed condition, preferably a lower concave curvature. In the assembled condition of the spring arrangement, a central portion of the first spring part flexes upwards, so that the lower convex curvature is formed to a straight line or a slightly concave curvature. The second spring part is bent open, this means the curvature radius is increased, whereby the spring stiffness of the whole spring arrangement increases.

The second spring part comprises a substantially straight bending portion and a curved portion following in a direction towards the first spring part. Substantially straight as that term is used herein shall include the possibility that this bending portion or a partial portion thereof may also have a large curvature, which radius is larger than that of the curved portion. Upon loading the first spring part, the bending portion is bent in direction towards the first spring end and thereby compensates a deformation of the first spring part. With increasing bending in the sense of opening of the second spring part, the tensile loadings and spring stiffness increase.

Preferably, the first spring part has a central receiving region for receiving a connection component, for example the wheel carrier or a carrier part connected thereto, wherein the central receiving region in particular has a larger thickness than adjacent regions of the first spring part following thereto. Because of the larger thickness, the stresses in the receiving region, which at the same time forms the area of force introduction from the connection component, are held low. The receiving region in particular has a flat upper side and/or a flat lower side, which can be aligned parallel to each other. Thus, a good force introduction of a carrier part is ensured which is attached to the leaf spring for carrying a motor vehicle wheel. This flat receiving region can have a length of approximately 150 mm up to 200 mm. The adjacent regions that laterally follow the receiving region can each have an inclination that, starting from the receiving region, is inclined towards the respective end of the first spring part. Overall it is thus provided a substantially U-shaped design of the first spring part in an unloaded condition.

The second spring part is shorter than the first spring part. The ratio between the first and the second spring part can be larger than 2:1 or, more particularly, larger than 3:1. The design of the spring follows from the technical requirements of the spring behaviour. Basically it applies, that the spring has a softer spring behaviour with a larger length of the second spring part in relation to the first spring part or correspondingly, a harder spring behaviour with a shorter length.

A largest thickness of the second spring part can be smaller than a largest thickness of the first spring part. Thus, the first spring part made from a fibre compound material has a high stiffness. At the same time, the second spring part, made from spring steel, has good bending characteristics. For the design lay-out it can be provided that the first spring part and/or the second spring part have a variable thickness along the length.

According to a possible embodiment, the cross-sectional area of the first spring part is substantially constant along the length, while the thickness can be variable along the height, for example in the area of the wheel carrier accommodation or of the end portion of the leaf spring. By means of a constant cross-sectional area, a constant fibre extension is achieved in the first spring part along the length, which leads to a high strength. It is, however, also possible that the cross-sectional area is variable along the length of the first spring part, which for example can be achieved by additional layers of prepregs in the corresponding regions.

According to a preferred embodiment, the first spring part is produced in one piece resin injection method (Resin Transfer Moulding, RTM) or by a pressing method. The first spring part can especially be manufactured from unidirectional pre-impregnated fibres, so-called prepregs, with a thermoset or thermoplastic matrix in a pressing process. In this manner, the required shape of the first spring part in the unloaded condition can be achieved in a simple manner. Glass fibres can be used as fibres for example.

The second spring part can be produced according to an advantageous embodiment from flexible rolled strip material. In the case of flexible rolling, spring material with substantially uniform sheet thickness is rolled to a spring material with variable sheet thickness along the length by changing the rolling gap during the process. The portions with variable thickness produced during the flexible rolling extend transversally to the longitudinal direction (rolling direction) of the strip material.

The second spring part can have a spring layer, or can be composed from two or more spring layers, which are each connected to the first spring part. The spring behaviour of the leaf spring can be set by the number of spring layers. In this case, the spring stiffness increases with increasing number of spring layers. The stresses are reduced in the second spring part by using several spring layers. When using two or more spring layers, the layers are arranged functionally parallel, and/or they act functionally parallel. This means in particular that each spring layer is fixed with one end to the first spring part and is fixed with the other end to the bearing. Thus, every single spring layer can transmit part of the entire forces and moments that are effective between the first spring part and the second spring part. The single spring layers can be configured as separate parts, wherein for example a first spring layer can be connected to an upper side of the first spring part and a second spring layer can be connected to a lower side of the first spring part, wherein the locations upper and lower refer to the built-in condition of the spring. According to an additional or alternative possibility, several spring layers can also be connected to each other, in particular produced in one piece. For this it can be provided that the second spring part comprises at least one slot which extends in a longitudinal direction. By means of the slot in the spring part, two parallel spring layers are formed. The slot can be formed finite, i.e. the two spring layers separated from each other by the slot are connected to each other at the two ends. It is also possible that the slot at one end extends up to the edge of the spring part, and at the other end is arranged at a distance from the edge.

The first and second spring part can be firmly connected to each other, in particular in a bending-resistant and, respectively, moment-resistant manner. Preferably, the connection is provided in an overlapping region of the two spring parts. Thereby it can be provided that the lower convex curvature of the first spring part and the lower concave curvature of the second spring part change into each other in the overlapping region. Thus, in the overlapping region, a change in curvature takes place between concave and convex, i.e., the overlapping region comprises a turning point with regard to the course of curvature of the leaf spring.

The connection between the two spring parts can generally be achieved in any technical possible manner, force-fittingly, form-fittingly, cohesively or by combinations thereof. A simple connection is achieved by means of screws, which in the overlapping region are passed through corresponding bores of the first and second spring part aligned with each other and are tightened respectively by a nut. Alternatively or in addition, one or more rubber elements (rubber bearing, rubber pad) can be provided for connecting the first to the second spring part. These enable a vibrational and acoustical decoupling of the plastic spring part and of the steel spring part. When using a single spring layer of the second spring part, the attachment portion of the first spring part can be clamped between the second spring part and a retaining plate. When using two or more spring layers, the first spring part can be arranged and clamped between these two spring layers. The attachment portion of the first spring part can be formed wedge-like with a thickness tapering towards the end. The opposite end portion of the first spring part, which is to be connected to a receiving device, can be formed wedge-like with a thickness which increases wedge-like towards the end. On this end, a supporting element can be attached for supporting the first spring part. The supporting element can be fixed to the first spring part by means of screw connections, for example. According to an alternative embodiment, the first and the second spring part can, in principle, also be connected articulatedly to each other, in particular around a pivot axis which extends transversally to the longitudinal extension of the leaf spring.

The second spring part can be produced from spring steel. Materials for producing technical springs are designated as spring steel. A technical spring is a component which can receive, store and then again release the force loading received from the outside. The spring steel is, preferably, tempered, i.e., is subjected to a heat treatment by hardening and following annealing for achieving an optimal combination of high strength and good ductility. The hardness of martensite is reduced during annealing and the ductility is improved. All hardenable steels can generally be used as materials for the spring steel. The spring characteristic in spring steel is achieved by the addition of different alloying elements. In this regard, the elements silicium, manganese, chromium, vanadium or molybdenum can be used separately or in combination. Especially good suitable for the requirements of springs are silicium-chromium-steels, silicium-chromium-vanadium-steels and chromium-vanadium-steels. For example, 51CrV4 can be named as a spring steel material, wherein any other spring steel can also be used. For the connection with a receiving device, the second spring part can have a bearing eye formed thereon at one end. This is, preferably, rolled to the steel component by using a forming method.

Furthermore, a leaf spring assembly for a wheel suspension of a motor vehicle comprises: a leaf spring, which can have one or more of the above named embodiments, a first receiving device in which a first end portion of the leaf spring is supported, a second receiving device in which a second end portion of the leaf spring is supported, wherein the first receiving device and the second receiving device can be formed such, that the first end portion and the second end portion of the leaf spring are held non-displaceably relative to each other.

An advantage of the leaf spring assembly is that, because the end portions are fixed in a non-displaceable way, the leaf spring is subjected to bending as well as to tension loads. In this case, the tensile and bending stresses occurring in the spring are superimposed to one another and together lead to a progressive spring characteristic. The tensile forces are generated in the leaf spring in that their end portions are each fixed in a non-displaceable way in the corresponding receiving devices. "Non-displaceable" means, in this context, that the end portions are fixedly clamped in longitudinal direction of the motor vehicle, so that they cannot be displaced substantially in longitudinal direction when the spring is loaded. It is understood, that a small displaceability which, for example, may occur due to load-related elastic deformations especially at a pivotable receiving device, should also be included. This small displaceability can be up to 20 mm, preferably up to 10 mm at each receiving device. Due to the substantially non-displaceable accommodation of the leaf spring ends, the tensioning force increases progressively with increasing loading of the leaf spring, so that also their spring rate increases progressively. In the built-in condition this causes the suspension to become stiffer with an increasing load on the motor vehicle, which has an advantageous effect on the driving comfort and the driving stability.

According to an embodiment, at least one of the first and of the second receiving devices is formed such that the respectively corresponding end portion is pivotably supported around a pivot axis extending transversally to the longitudinal vehicle axis.

"At least one of the receiving devices" means that, according to a first possibility, only one of the first and second receiving device is formed as a pivotable, i.e., moment-free, bearing for the associated spring end, whereas the other receiving device is provided in the form of a stiff, i.e., moment-resistant bearing. A pivotability leads to moment-free conditions around the pivot axis, so that the terms pivotable and moment-free are in the present context used as synonyms. A moment-resistant bearing is thus also designated as stiff in the present disclosure. Associating of the pivotable (moment-free) and stiff (moment-resistant) bearing to the first and second spring part, respectively, can deliberately be selected depending on the requirements of the spring behaviour. According to a second possibility, both receiving devices can also be formed as moment-free bearings.

A moment-free support leads to reduced forces at the receiving device between the leaf spring and the receiving device. The moment-free support is achieved more particularly in that the associated end portion is pivotably supported around a pivot axis in the receiving device, and/or relative to a stationary component. The pivot axis extends preferably at least substantially transversally to the longitudinal vehicle axis, wherein angular deviations of ±10° relative to a normal to the longitudinal vehicle axis shall be included. The pivot bearing is preferably designed such, that rotational movements of the pivotably received spring end are possible around the pivot axis up to at least 10° and/or up to maximal 60°, preferably by a rotational angle of 25° up to 45°.

The assignment of the longer spring part or the shorter spring part to the moment-free or moment-resistant receiving device is deliberately selectable in dependency of the required suspension behaviour. In a moment-resistant support of the longer first spring part and a moment-free support of the shorter spring part, a relative high spring rate or high spring force is achieved. In reversed assignment, i.e., a moment-free support of the longer first spring part and a moment-resistant support of the shorter second spring part, a spring rate reduced by a multiple and lower spring forces are achieved. The lowest spring rates and spring forces occur if both ends of the leaf spring are supported moment-free.

SUMMARY OF THE DRAWINGS

Example embodiments of the invention are described with reference to the drawings.

FIG. 1A illustrates an example leaf spring for a wheel suspension of a motor vehicle in a first embodiment in a side view.

FIG. 1B illustrates an example leaf spring for a wheel suspension of a motor vehicle in a first embodiment in a top view.

FIG. 1C illustrates an example leaf spring for a wheel suspension of a motor vehicle in a first embodiment in a three-dimensional view.

FIG. 1D illustrates an example leaf spring for a wheel suspension of a motor vehicle in a first embodiment, the second spring part shown as a detail in a side view.

FIG. 1E illustrates an example leaf spring for a wheel suspension of a motor vehicle in a first embodiment, the second spring part shown as a detail in a top view.

FIG. 2A illustrates an example leaf spring for a wheel suspension of a motor vehicle in a second embodiment in a side view.

FIG. 2B illustrates an example leaf spring for a wheel suspension of a motor vehicle in a second embodiment in a top view.

FIG. 2C illustrates an example leaf spring for a wheel suspension of a motor vehicle in a second embodiment in a three-dimensional view.

FIG. 3A illustrates an example leaf spring for a wheel suspension of a motor vehicle in a third embodiment in a side view.

FIG. 3B illustrates an example leaf spring for a wheel suspension of a motor vehicle in a third embodiment in a top view.

FIG. 3C illustrates an example leaf spring for a wheel suspension of a motor vehicle in a third embodiment in a three-dimensional view.

FIG. 4A illustrates an example leaf spring for a wheel suspension of a motor vehicle in a fourth embodiment in a side view.

FIG. 4B illustrates an example leaf spring for a wheel suspension of a motor vehicle in a fourth embodiment in a top view.

FIG. 4C illustrates an example leaf spring for a wheel suspension of a motor vehicle in a fourth embodiment in a three-dimensional view.

FIG. 5A illustrates an example leaf spring for a wheel suspension of a motor vehicle in a fifth embodiment in a side view.

FIG. 5B illustrates an example leaf spring for a wheel suspension of a motor vehicle in a fifth embodiment in a top view.

FIG. 5C illustrates an example leaf spring for a wheel suspension of a motor vehicle in a fifth embodiment in a three-dimensional view.

FIG. 5D illustrates an example leaf spring for a wheel suspension of a motor vehicle in a fifth embodiment, including the connection between first and second spring part in a three-dimensional view from inclined below.

FIG. 6A illustrates an example leaf spring for a wheel suspension of a motor vehicle in a sixth embodiment in a side view.

FIG. 6B illustrates an example leaf spring for a wheel suspension of a motor vehicle in a sixth embodiment in a top view.

FIG. 6C illustrates an example leaf spring for a wheel suspension of a motor vehicle in a sixth embodiment in a three-dimensional view.

FIG. 7A illustrates an example leaf spring for a wheel suspension of a motor vehicle in a seventh embodiment in a side view.

FIG. 7B illustrates an example leaf spring for a wheel suspension of a motor vehicle in a seventh embodiment in a top view.

FIG. 7C illustrates an example leaf spring for a wheel suspension of a motor vehicle in a seventh embodiment in a three-dimensional view.

FIG. 8A illustrates an example leaf spring for a wheel suspension of a motor vehicle in an eighth embodiment in a side view.

FIG. 8B illustrates an example leaf spring for a wheel suspension of a motor vehicle in an eighth embodiment in a top view.

FIG. 8C illustrates an example leaf spring for a wheel suspension of a motor vehicle in an eighth embodiment in a three-dimensional view.

FIG. 8D illustrates an example leaf spring for a wheel suspension of a motor vehicle in an eighth embodiment, the second spring part shown as a detail in a side view, FIG. 8E illustrates an example leaf spring for a wheel suspension of a motor vehicle in an eighth embodiment, the second spring part shown as a detail in a top view;

FIG. 9A illustrates an example leaf spring for a wheel suspension of a motor vehicle in a ninth embodiment in a side view.

FIG. 9B illustrates an example leaf spring for a wheel suspension of a motor vehicle in a ninth embodiment in a top view.

FIG. 9C illustrates an example leaf spring for a wheel suspension of a motor vehicle in a ninth embodiment in a three-dimensional view.

FIG. 10A illustrates an example leaf spring for a wheel suspension of a motor vehicle in a tenth embodiment in a side view.

FIG. 10B illustrates an example leaf spring for a wheel suspension of a motor vehicle in a tenth embodiment in a top view.

FIG. 10C illustrates an example leaf spring for a wheel suspension of a motor vehicle in a tenth embodiment in a three-dimensional view.

FIG. 11A illustrates an example leaf spring for a wheel suspension of a motor vehicle in an eleventh embodiment in a side view.

FIG. 11B illustrates an example leaf spring for a wheel suspension of a motor vehicle in an eleventh embodiment in a top view.

FIG. 11C illustrates an example leaf spring for a wheel suspension of a motor vehicle in an eleventh embodiment in a three-dimensional view.

DESCRIPTION

Figure 12A:
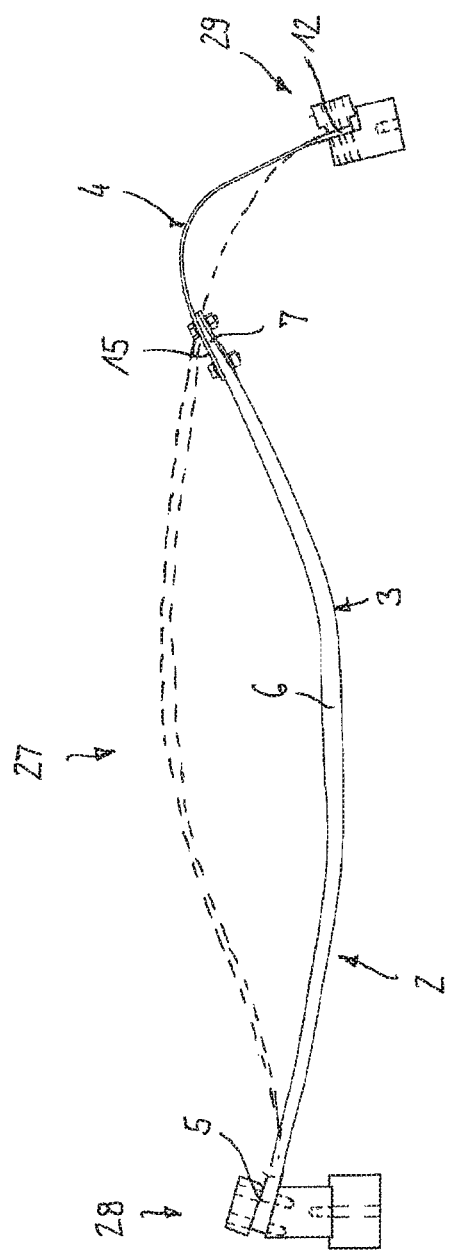
FIG. 12A illustrates an example leaf spring assembly with a leaf spring according to FIG. 1.

FIGS. 1A to 1E are described together in the following. A leaf spring 2 is shown in a first embodiment. The leaf spring 2 has a first spring part 3 made from fibre reinforced plastic material and, securely connected thereto, a second spring part 4 made from a spring steel. The first spring part 3 serves for resiliently supporting a wheel carrier (not shown) of a motor vehicle. For this, the leaf spring 2 is accommodated with its ends in corresponding receiving devices, which are connected to the vehicle body.

The first spring part 3 has a first end portion 5, which is to be supported in one of the receiving devices, a central receiving region 6 for receiving a wheel carrier (not shown), as well as a connection portion 7, which is connected to the second spring part 4. The central receiving region 6, which is arranged within a middle third of the first spring part 3, has a larger thickness D6 as compared to the adjacent regions following thereto. The upper side 8 and the lower side 9 of the receiving region 6 have planar faces which, more particularly, are arranged parallel to each other. The planar faces ensure a good mounting ability and constant force introduction of the wheel carrier into the leaf spring 2. The receiving region 6 can, for example, have a length of 150 mm, up to 200 mm. The adjacent regions that laterally follow the receiving region 6 each have an inclination that, starting from the receiving region, is inclined towards the respective end of the first spring part. The thickness of the first spring part 3 is variable along the length. The first end portion 5 is thickened and has towards the end a slightly wedge-like expanding contour. The connection portion 7 has a slightly tapering contour towards the end.

The second spring part 4 has a second end portion 12, which is to be supported in a corresponding second receiving device (not shown) of the motor vehicle, a bending portion 13, a curve portion 14, and a connection portion 15, which is connected to the first spring part 3. For connecting the first and the second spring portion 3, 4 the connection portions 7, 12 are arranged in an overlapping manner and are clamped by means of screw connections 16, 17. For this, the second spring part 4 with its connection portion 12 is put onto an upper side of the first spring part 3. From below, a counter plate 18 is attached to the connection portion 7 of the first spring part 3. Screws 16 are passed through corresponding bores in the connection portions 7, 12 and passed through the counter plate 18, onto which ends nuts 17 are screwed. In this manner, the connection portion 7 of the first spring part 3 is securely clamped to the second spring part.

The first spring part 3 has in the built-in condition a main extension in a longitudinal direction (horizontal direction) of the motor vehicle. The second spring part 4 has compared thereto a main extension, oriented more to the height direction (vertical direction) of the motor vehicle. In the assembled condition the first end 5 can face forward in a driving direction, while the second end 12 is arranged at the back and is more particularly directed downwards. The first spring part 3 deflects when the leaf spring 2 is loaded and thus forms a spring portion. When the leaf spring 3 is under load, the second spring part 4 is deflected and thus forms a bendable portion. In this case, the vertical forces, introduced by the wheel carrier into the spring portion, lead to a tensile loading of the spring portion, whereby the bending of the bendable portion is effected in direction towards the distanced end portion 5.

The first and the second spring parts 3, 4 differ from each other concerning their materials, their lengths and curvature. It can be seen that the length of the first spring part 3 is many times larger than that of the second spring part 4, wherein the ratio of the length of the first spring part 3 to the length of the second spring part 4 can be larger than two and/or smaller than five. The first spring part 3 has a lower convex and/or an upper concave curvature, in particular with an average curvature radius R3. The second spring part 4 has a lower convex and/or an upper concave curvature. A change of curvature of the leaf spring extension takes place in the connection area of the two spring parts 3, 4. By configuration of the first spring part 3 and of the second spring part 4, the suspension behaviour and, thus, the progression of the leaf spring 3 during loading, can be set. The longer the second spring part 4, the softer the spring is. In the present embodiment, the average curvature radius R3 of the first spring part 3 is larger by a multiple than the curvature radius R14 of the curvature portion 14 of the second spring part.

The first spring part 3 is produced from a fibre reinforced plastic material, especially from a glass fibre reinforced plastic (GRP), wherein other fibres are not excluded. Production can take place for example by resin injection moulding (Resin Transfer Moulding, RTM) or by a pressing method. In this case, unidirectional pre-impregnated fibres, so called "prepregs", are compressed with thermoset or thermoplastic matrix.

The second spring part 4 is made from a heat treated spring steel. As material for the spring, steel hardenable steels are used, wherein the spring characteristics can be influenced by adding different alloying elements. Especially suitable for the requirements of the springs are siliciumchromium-steels, silicium-chromium-vanadium-steels and chromium-vanadium-steels (for example 51CrV4). In particular in FIG. 1D it can be seen that the second spring part 4 has a variable thickness along the length. The thickness D15 of the connection portion 15 is larger than the thickness D14 of the curved portion 14. The end portion 12 has a once more reduced thickness D12. The thickness D15 can, for example, be between 4.5 and 5.5 mm, the thickness D14 can, for example, be between 3.5 and 4.5 mm and the thickness D12 can, for example, be less than 4.0 mm.

For producing a variable thickness along the length, the second spring part 4 can be produced from flexible rolled strip material. A possible process can comprise the steps flexible rolling, annealing, longitudinal or transversal cutting, fine punching, heat treatment, blasting of the surface, setting and coating.

It can be seen in particular in FIG. 1E that the width of the second spring part 4 varies along the length. The connection portion 15 has the smallest width B15. In the transition between the connection portion 15 and curved portion 14 as well in the latter itself, the width continuously increases. In the bending portion 13 and end portion 12, the width B13 is the largest.

FIGS. 2A to 2C, which are described in the following together, show a leaf spring 2 according to a second embodiment. This largely corresponds to the embodiment of FIGS. 1A to 1E, so that concerning common features it is referred to the above description. The same and, respectively, modified details are provided with the same reference numerals as in FIGS. 1A to 1E. The only difference of the present embodiment according to FIGS. 2A to 2C is that the end portion 12 of the second spring part 4 is bent upwards. Thus, in dependency of the assembly situation, a redirection of the end portion 12 to a deliberate attachment point can be carried out. Both ends can be, as in the above embodiment, moment-resistant and non-displaceably supported.

FIGS. 3A to 3C, which are described together in the following, show a leaf spring 2 according to the invention in a further embodiment. This largely corresponds to the embodiment according to FIGS. 1A to 1E, so that concerning the commonalities it is referred to the above description. The same and, respectively, modified details are provided with the same reference numerals as in FIGS. 1A to 1E.

A first difference of the present embodiment according to FIGS. 3A to 3C is, that at the end portion 5 of the first spring part 3 a bearing element 19 is attached, which also can be designated as a bearing eye. The bearing element 19 has a bushing 20 for a rotatable support on a receiving device (not shown) and an attachment portion 21, which is formed by two webs, distanced from each other and in which the end portion 5 of the spring engages. For fixing purposes screws 22 are provided, which are passed through corresponding bores in the attachment portion 21 and the end portion 5 and are clamped by nuts 23.

A further difference is that the end portion 12 of the second spring part 4 has a bearing eye 24 formed thereon. With the two bearing eyes 19, 24, the leaf spring 2 is non-displaceably and in a moment-free manner accommodated in corresponding receiving devices.

FIGS. 4A to 4C, which are described together in the following, show a leaf spring 2 according to a further embodiment. This largely corresponds to the embodiment of FIGS. 3A to 3C, so that concerning the commonalities it is referred to the above description. The same and, respectively, modified details are provided with the same reference numerals as in FIGS. 3A to 3C, respectively 1A to 1E.

The present embodiment of FIGS. 4A to 4C has at the first end portion 5 a bearing element 19, as in the embodiment of FIG. 3. In a modification to the embodiment of FIG. 3 the second end portion 12 of the second spring part 4 is bent upwards, so that the second bearing element 24 is arranged above a lower part of the bending portion 13. Thus, a different attachment point is achieved for supporting the leaf spring on the vehicle body.

FIGS. 5A to 5D, which are described in the following together, show a leaf spring 2 according to the invention in a further embodiment. This largely corresponds to the embodiment of FIGS. 1A to 1E, so that concerning the commonalities it is referred to the above description. The same and, respectively, modified details are provided with the same reference numerals as in FIGS. 1A to 1E.

A difference of the present embodiment of FIGS. 5A to 5D lies in the configuration of the second spring part 4. This is formed in two pieces and comprises two spring layers 4', 4", which are arranged functionally parallel to each other. In this case, a first spring layer 4' is attached with its connection portion 15' on an upper side of the first spring part 3 and a second spring layer 4" is attached on a lower side of the first spring part 3, so that the connection portion 7 of the first spring part 3 is clamped between the two spring layers 4', 4" by means of screws 16. The two end portions 12', 12" of the spring layers 4', 4" are to be supported in a corresponding receiving device. Overall, by means of the two-layered configuration the stresses are reduced in the second spring part 4. The two spring ends are, preferably, moment-resistant and non-displaceably supported.

FIGS. 6A to 6C, which are described together in the following, show a leaf spring 2 according to a further embodiment. This corresponds to a combination of the embodiments of FIGS. 5A to 5D and of FIGS. 3A to 3C, so that concerning the commonalities it is referred to the above description. The same and, respectively, modified details are provided with the same reference numerals as in FIGS. 5A to 5D, respectively as in FIGS. 3A to 3C, respectively 1A to 1E.

It can be seen that on the first end portion 5 a bearing element 19 is attached, as shown in and described with FIGS. 3A to 3C. The second spring part 4 is, as shown in the embodiment of FIGS. 5A to 5D, formed with two layers (with spring layers 4', 4"). The present leaf spring combines the technical characteristics that the first end 5 can be supported moment-free and non-displaceably in a corresponding receiving device and that the stresses occurring in the second spring part 4 during operation are reduced.

FIGS. 7A to 7C, which are described together in the following, show a leaf spring 2 according to a further embodiment. This corresponds to a combination of the embodiments of FIGS. 3A to 3C and of FIGS. 6A to 6C, respectively, so that concerning the commonalities it is referred to the above description. The same and, respectively, modified details are provided with the same reference numerals as in FIGS. 3A to 3C, FIGS. 6A to 6C, and 1A to 1E.

It can be seen that on the first end portion 5 a bearing element 19 is attached and that on the second end portion 12 a bearing element 24 is formed on, as shown in and described with FIGS. 3A to 3C. The second spring part 4 is further, as shown in the embodiment of FIGS. 6A to 6C, formed with two layers (with spring layers 4', 4"). The present leaf spring combines the technical characteristics that the two ends 5, 12 can be supported moment-free and non-displaceably in a respective receiving device and that the second spring part 4 is subjected to reduced stresses during operation.

FIGS. 8A to 8D, which are described jointly in the following, show a leaf spring 2 according to a further embodiment. This largely corresponds to the embodiment of FIGS. 1A to 1E, so that concerning the commonalities it is referred to the above description. The same and, respectively, modified details are provided with the same reference numerals as in FIGS. 1A to 1E.

A special feature of the present embodiment according to the FIGS. 8A to 8D is that the second spring part 4 has a slit 25. In this way, the second spring part 4 forms two mutually parallel spring layers 4', 4", which also generate a functionally parallel spring effect. It can be seen that the slit 25 is finite, that is, the ends 26, 26' of the slit are each spaced from the terminal edge of the spring member. The spring member 4 can be produced as a sheet metal component made of spring steel, in which the slit 25 is produced prior to forming. Apart from that, the present embodiment corresponds to that according to FIGS. 1A to 1E to which description reference is hereby made.

FIGS. 9A to 9C, which are described together hereinafter, show an example leaf spring 2 in a further embodiment. This largely corresponds to the embodiment shown in FIGS. 2a to 2c, so that in terms of similarities reference is made to the above description. Identical and/or, modified details are provided with the same reference numerals as in FIGS. 2a to 2c.

The only difference of the present embodiment according to FIGS. 9A to 9C is that the second spring part 4 has a slit 25, similar to the embodiment according to FIGS. 8A to 8D. In this way, the second spring part 4 forms two spring layers 4', 4" extending parallel to each other, which also generate a functionally parallel spring effect. It can be seen that the slit 25 is finite, that is, the ends 26, 26' of the slit are each spaced from the terminal edge of the spring part 4. Apart from that the present embodiment corresponds to that according to FIGS. 2A to 2C to which description it is thus referred.

FIGS. 10A to 10C, which will be described together below, show a leaf spring 2 according to a further embodiment. This largely corresponds to the embodiment shown in FIGS. 3A to 3C, so that in terms of similarities it is referred to the above description. Identical and, respectively, modified details are provided with the same reference numerals as in FIGS. 3A to 3C.

The only difference of the present embodiment according to the FIGS. 10a to 10c is that the second spring member 4 has a slit 25, similar to the embodiments according to FIGS. 8 and 9. The second spring portion 4 thus has two spring layers 4', 4" extending parallel to each other, which also generate a functionally parallel spring effect. The slit 25 is finite, that is, the two spring layers 4', 4" are connected to each other at the ends. Apart from that, the present embodiment corresponds to that in accordance with the FIGS. 3A to 3C, to the description of which it is thus referred.

FIGS. 11A to 11C, which are described together hereinafter, show a leaf spring 2 according to a further embodiment. This corresponds largely to the embodiment according to FIGS. 4A to 4C, so that in terms of similarities it is referred to the above description. Identical and, respectively, modified details are provided with the same reference numerals as in FIGS. 4A to 4C.

The only difference of the present embodiment according to the FIGS. 11A to 11C is that the second spring member 4 has a slit 25, similar to the embodiments according to FIGS. 8 to 10. The second spring portion 4 thus has two spring layers 4', 4" extending parallel to each other, which also generate a functionally parallel spring effect. The slit 25 is finite, that is, the two spring layers 4', 4" are connected to each other at the ends. Apart from that, the present embodiment corresponds to that according to FIGS. 4A to 4C, to the description of which it is thus referred.

It is understood that other embodiments of combinations of the above embodiments are possible, which are not shown here in detail. In particular, it is also possible to combine any of the embodiments according to FIGS. 5, 6 and 7 with the embodiments according to FIGS. 8 to 11. Concretely, one or more of the superimposed spring layers 4', 4" of the embodiments according to FIGS. 5, 6 and 7 can also be provided with a slit 25, as shown in FIGS. 8 to 11. Thus, a second spring part 4 is produced with two superposed spring layers 4', 4" which, in turn, each have two laterally adjacent, parallel extending partial spring layers 4', 4". Overall, thus a spring part 4 is achieved with four functional parallel partial spring layers.

For receiving devices for all the above embodiments the following applies: A receiving device for a tongue-like spring end (without bearing eye) can be formed such that the leaf spring is accommodated non-displaceably and moment-free. In particular, it can be provided that the respective end is held substantially stiff in relation to all three spatial axes (x, y, z) in the sense of displacement.

An accommodation device for a spring end with bearing eye can be formed such that the respective end portion is pivotably supported around a pivot axis (x) of the receiving device. The pivot axis extends in the built-in condition approximately transversally to the longitudinal vehicle axis, wherein certain angle deviations may be possible. Compared to the other two spatial axes (y, z), the respective spring end is held at least substantially stiff in the rotational sense, i.e., non-pivotably.

Figure 12B:
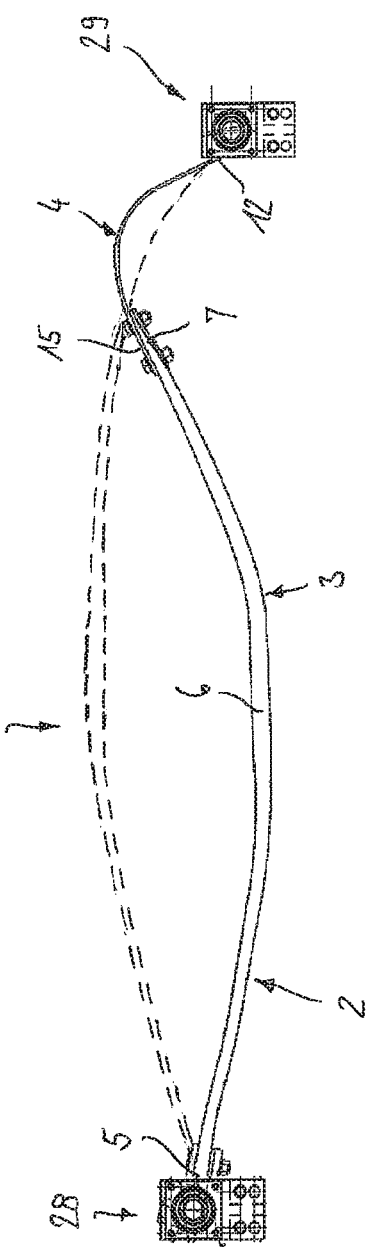
FIG. 12B illustrates an example leaf spring assembly with a leaf spring according to FIG. 3.

The assignment of non-displaceable and pivotable spring ends is arbitrary and to be adapted to the technical requirements. FIGS. 12A and 12B which are described jointly below show, exemplarily, two leaf spring assemblies 27 with leaf spring 2 and receiving devices 28, 29.

The leaf spring assembly 27 shown in FIG. 12a has a leaf spring 2 according to FIGS. 1A to 1E and corresponding receiving devices 28, 29 for a moment-resistant support. Specifically, the first spring end 5 of the leaf spring 2 is fixed in the first receiving device 28 so as to be moment-resistant and non-displaceable. The second spring end 12 is fixed in the second receiving device 29 so das to be moment-resistant and non-displaceable.

The leaf spring assembly according to FIG. 12B comprises a leaf spring 2 according to FIGS. 3A to 3C and correspondingly two receiving devices 28, 29 for moment-free support. Here, the first spring end 5 of the leaf spring 2 is mounted with the bearing eye 20 in the first receiving device 28 so as to be moment-free and un-displaceable. The second spring end 12 is mounted with the bearing eye 24 in the second receiving device 29 so as to be moment-free and un-displaceable.

The leaf spring assemblies 27 are shown in the unloaded built-in condition of the respective leaf spring 2, wherein the first spring part 3 has a lower convex curvature. Unloaded built-in condition means, in particular, that no or no significant forces act on the leaf spring. With increasing load of the leaf spring 2 due to forces introduced by the vehicle axle, the first spring part 3 is deflected upward. It is provided that the first spring part 3 in the loaded built-in state of the leaf spring 2, at maximum deflection, has a lower concave curvature (shown schematically in phantom). Thus, with an increasing load of the leaf spring 2 a transition of the curvature of the first spring part 3 from convex to concave takes place, wherein between said two positions a neutral position exists. The leaf spring 2 can be designed such that the neutral position is existent in a ready-to-deflect loaded built-in condition, that is, in a standing-still not-laden or low laden vehicle condition. With further increasing load, i.e. under a laden condition or dynamic compression movement, the leaf tension spring 2 is further deflected elastically, wherein the first spring part 3 is increasingly subjected to tensional loads. In other words, the leaf spring assembly 27 is configured such that the first spring part 3 of the leaf spring 2 when being elastically deformed due to vertical forces introduced by the wheel carrier is subjected to pressure loads in a first spring travel range and, with increasing load and thus increasing elastic deformation, is subjected to tension loads in a second spring travel range.

Overall, the leaf tension springs offer the advantage of a good combination of strength and low weight, with at the same time a progressive spring rate.

The invention claimed is:

1. A leaf spring assembly for a wheel suspension of a motor vehicle, comprising:
    a leaf spring with a first spring part made from a fibre reinforced plastic material and a second spring part made from a steel material, namely spring steel,
    wherein the first spring part comprises a first spring end portion of the leaf spring and wherein the second spring part comprises a second spring end portion of the leaf spring,
    wherein the first spring part and the second spring part are longitudinally connected to each other in a connecting region arranged longitudinally between the first spring end portion and the second spring end portion,
    wherein a ratio of a length of the first spring part to a length of the second spring part is greater than two, and wherein in a relaxed condition the first spring part comprises a lower convex curvature and the second spring part, starting from the first spring part, is bent downwards and comprises a lower concave curvature;
    a first receiving device, in which the first end portion of the leaf spring is supported;
    a second receiving device, in which a second end portion of the leaf spring is supported;
    wherein the first receiving device and the second receiving device are configured such that the first end portion and the second end portion of the leaf spring are held so as to be non-displaceable relative to each other.

2. The leaf spring assembly of claim 1, wherein the second spring part comprises at least a first spring layer and a second spring layer that are connected to the first spring part.

3. The leaf spring assembly of claim 2, wherein the first spring layer is connected to an upper side of the first spring part and the second spring layer is connected to a lower side of the first spring part.

4. The leaf spring assembly of claim 1, wherein the second spring part comprises a slit that extends in a longitudinal direction.

5. The leaf spring assembly of claim 4, wherein at least one end of the slit is arranged with a distance from an edge of the second spring part.

6. The leaf spring assembly of claim 1, wherein a largest curvature radius of the second spring part is smaller than a largest curvature radius of the first spring part.

7. The leaf spring assembly of claim 1, wherein the first spring part has a central receiving region for receiving a connection component and the central receiving region is arranged in a middle third of the first spring part.

8. The leaf spring assembly of claim 7, wherein the central receiving region has a larger thickness than adjoining regions of the first spring part, wherein the adjoining regions starting from the central receiving region are inclined at both sides towards a respective end of the first spring part in an unloaded built-in condition of the leaf spring.

9. The leaf spring assembly of claim 1, wherein the second spring part has a variable thickness along the length.

10. The leaf spring assembly of claim 9, wherein the second spring part is made from a flexibly rolled strip material.

11. The leaf spring assembly of claim 1, wherein the first spring part and the second spring part are connected to each other in an overlapping region.

12. The leaf spring assembly of claim 11, wherein the lower convex curvature of the first spring part and the lower concave curvature of the second spring part change into one another in the overlapping region.

13. The leaf spring assembly of claim 1, wherein at least one of the first or the second receiving device is formed such that the respective end portion is pivotably supported around a pivot axis extending transversely to a longitudinal vehicle axis.

* * * * *